Patented Feb. 3, 1942

2,271,668

UNITED STATES PATENT OFFICE 2,271,668

POLYVINYL ACETAL RESIN

Donald R. Swan, Rochester, N. Y., assignor to Eastman Kodak Company, Rochester, N. Y., a corporation of New Jersey No Drawing. Application March 15, 1939, Serial No. 262,069. In Great Britain March 22, 1938

2 Claims. (Cl. 260—73)

This invention relates to polyvinyl acetal resins and more particularly to polyvinyl acetal resins having improved resistance to moisture.

Simple polyvinyl acetal resins (i. e. those in which the acetal linkages are formed from but one kind of acetal group) have been prepared from polyvinyl alcohols by condensation of aldehydes therewith, in the presence of an acetal condensation catalyst. Simple polyvinyl acetal resins have also been prepared by concomitantly deesterifying a polyvinyl ester and condensing the deesterified product with an aldehyde, in the presence of a deesterification catalyst, the deesterification catalyst serving also to accelerate the condensation of the deesterified product with the aldehyde.

The polyvinyl acetal resins prepared from acetaldehyde are probably the most interesting of the polyvinyl acetal resins in which the acetal linkages are formed from but a single saturated aliphatic aldehyde. These polyvinyl acetaldehyde acetal resins appeared to be useful for a variety of purposes in the plastics field. For example, such resins can be cast from ordinary simple solutions into the form of transparent film or sheet of fairly low thermoplasticity. However, the film or sheet is too brittle to be adapted commercially to certain uses; for instance, the film or sheet is too brittle to serve as a support for light-sensitive photographic coatings in the manufacture of cinematographic film. Efforts to decrease the brittleness of such resins by changing the chemical composition thereof, viz. by increasing the hydroxyl group content, have resulted in resins which are too water-susceptible to be employed commercially in the manufacture of cinematographic film.

Film or sheet made from polyvinyl butyraldehyde acetal resins is fairly resistant to moisture, but is too thermoplastic to be employed in the manufacture of cinematographic film.

It is also known that polyvinyl acetaldehyde acetal resins can be improved by introducing butyraldehyde acetal groups into the resin, so that from about 20 to 40 mole per cent of the total acetal groups in the resin are butyraldehyde acetal groups while the remainder are acetaldehyde acetal groups. Film or sheet made from such butyraldehyde-acetaldehyde acetal resins is of lower moisture susceptibility than film or sheet made from polyvinyl acetaldehyde acetal resins and of lower thermoplasticity than film or sheet made from polyvinyl butyraldehyde acetal resins.

I have now found that polyvinyl acetaldehyde acetal resins can be further improved, particularly as to moisture resistance, by introducing branched-chain saturated aliphatic aldehyde acetal groups (containing from 4 to 8 carbon atoms) into the resin, so that a portion of the acetal groups are branched-chain saturated aliphatic acetal groups, while the remainder are acetaldehyde acetal groups. Film or sheet made from my new resins has especially low moisture susceptibility, being superior to film or sheet made from any of the aforesaid known resins in this respect, while, at the same time, possessing a fairly low thermoplasticity.

It is an object of my invention, therefore, to provide new resins. A further object is to provide a process for preparing my new resins. A further object is to provide film or sheet of my new resins. Other objects will appear hereinafter.

According to my invention, I prepare my new resins by condensing a polyvinyl alcohol with acetaldehyde and with a branched-chain saturated aliphatic aldehyde containing from 4 to 8 carbon atoms, in the presence of an acetal condensation catalyst. More advantageously, I prepare my new resins by concomitantly deesterifying a polyvinyl ester and condensing the deesterified product with acetaldehyde and with a branched-chain saturated aliphatic aldehyde containing from 4 to 8 carbon atoms, in the presence of an acid deesterification catalyst.

Of the total aldehydes which I employ in preparing one of my new resins from about 60 to about 80 mole per cent should be acetaldehyde and the remainder branched-chain saturated aliphatic aldehyde. In the case of branched-chained saturated aliphatic aldehydes containing 4 or 5 carbon atoms, from about 60 to about 70 mole per cent of acetaldehyde is advantageously employed, and in the case of branched-chain saturated aliphatic aldehydes containing 6 to 8 carbon atoms, from about 70 to about 80 mole per cent of acetaldehyde is advantageously employed.

The total aldehyde employed is advantageously in excess of that actually needed to combine with all the hydroxyl groups in the polyvinyl alcohol or deesterified polyvinyl ester; excesses up to 100% are advantageously employed. The condensation of the total aldehydes with the polyvinyl alcohol or deesterified polyvinyl ester should be continued until the amount of hydroxyl groups remaining uncombined is equivalent to not more than about 15% by weight of polyvinyl alcohol, based on the weight of the finished polyvinyl acetal resin. In the case of employing a polyvinyl ester as a starting material deesterification and condensation should be continued until the amount of ester groups remaining is equivalent to not more than about 10 per cent by weight of polyvinyl ester, based on the weight of the finished polyvinyl acetal resin. The amount of ester groups is advantageously still lower, e. g. equivalent to as low as 5 or even 2 per cent of polyvinyl ester.

As branched-chain saturated aliphatic aldehydes the following are especially useful in practicing my invention: isobutyraldehyde, isovaleraldehyde, isohexaldehyde, 2-ethylbutyraldehyde and 2-ethylhexaldehyde. All of these aldehydes contain branched-chains as is apparent from the following formulas:

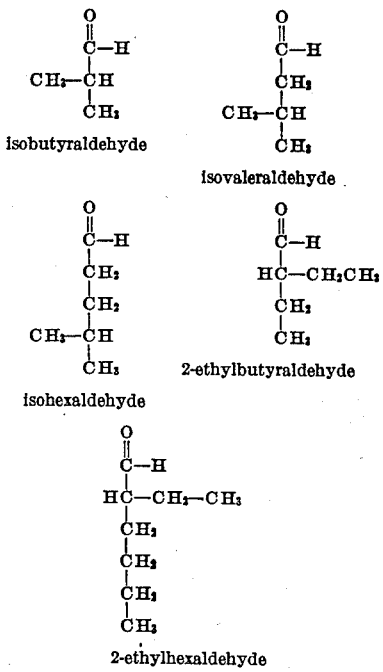

The following examples will serve to illustrate the manner of preparing my new resins. These examples are not intended to limit my invention.

EXAMPLE 1.—*Polyvinyl acetaldehyde (60)-isobutyraldehyde (40) acetal resin*

210 g. (2.4 mol.) of polyvinyl acetate (25 centipoises) were dissolved in about 500 g. of methanol. To this solution were added 72 g. (1 mol.) of isobutyraldehyde and 62 g. (1.4 mol.) of paraldehyde and 50 cc. of hydrochloric acid (sp. g. 1.18). The resulting solution was allowed to stand at about 40° C. for about four days. The reaction mixture was then diluted with about twice its volume of 95% ethyl alcohol. The diluted reaction mixture was poured into cold water to precipitate the resin. The precipitated resin was thoroughly washed with water and dried at about 50° C. for about twenty-four hours. The resin contained a hydroxyl group content equivalent to about 11.8 percent by weight of polyvinyl alcohol and an acetate group content equivalent to about 2.5 percent by weight of polyvinyl acetate. Of the total aldehydes (2.4 mol.) in the reaction mixture, 60 mol. percent (1.4 mol.) was acetaldehyde.

EXAMPLE 2.—*Polyvinyl acetaldehyde (70)-isobutyraldehyde (30) acetal resin*

172 g. (2 mol.) of polyvinyl acetate (25 centipoises) were dissolved in about 500 cc. of 95% ethyl alcohol. To this solution were added, with stirring, 43 g. (0.6 mol.) of isobutyraldehyde, 67 g. (1.5 mol.) of paraldehyde and 50 cc. of hydrochloric acid (sp. g. 1.18). The resulting solution was allowed to stand at about 40° C. for about four days. The reaction mixture was then diluted with about twice its volume of 95% ethyl alcohol. The diluted reaction mixture was poured into cold water to precipitate the resin. The precipitated resin was thoroughly washed with water and dried at about 50° C. for about twenty-four hours. The resin contained a hydroxyl group content equivalent to about 11.4 percent by weight of polyvinyl alcohol and an acetate group content equivalent to about 2.2 percent by weight of polyvinyl acetate. Of the total aldehydes (2.1 mol.) in the reaction mixture, 70 mol. percent (1.5 mol.) was acetaldehyde.

EXAMPLE 3.—*Polyvinyl acetaldehyde (80)-isobutyraldehyde (20) acetal resin*

200 g. (2.3 mol.) of polyvinyl acetate (25 centipoises) were dissolved in about 600 cc. of 95% ethyl alcohol. To this solution were added 36 g. (0.5 mol.) of isobutyraldehyde, 84 g. (1.9 mol.) of paraldehyde and 50 cc. of hydrochloric acid (sp. g. 1.18), with stirring. The resulting solution was allowed to stand at about 40° C. for about four days. The reaction mixture was then diluted with about three times its volume of acetone. The diluted reaction mixture was poured into cold water to precipitate the resin. The resin was thoroughly washed with water and dried at about 50° C. for about twenty-four hours. The resin contained a hydroxyl group content equivalent to about 11.4 percent by weight of polyvinyl alcohol and an acetate group content equivalent to about 4.7 percent by weight of polyvinyl acetate. Of the total aldehydes (2.4 mol.) in the reaction mixture, 80 mol. percent (1.9 mol.) was acetaldehyde.

EXAMPLE 4.—*Polyvinyl acetaldehyde (60)-isobutyraldehyde (40) acetal resin*

200 g. (2.3 mol.) of polyvinyl acetate (25 centipoises) were dissolved in about 600 cc. of 95% ethyl alcohol. To this solution were added, with stirring, 72 g. (1 mol.) of isobutyraldehyde, 62 g. (1.4 mol.) of paraldehyde and 50 cc. of hydrochloric acid (sp. g. 1.18). The resulting solution was allowed to stand at about 40° C. for about four days. The reaction mixture was then diluted with about three times its volume of acetone. The diluted reaction mixture was then poured into cold water to precipitate the resin. The precipitated resin was thoroughly washed with water and then dried at about 50 cc. for about twenty-four hours. The resin contained a hydroxyl group content equivalent to about 12.0 percent by weight of polyvinyl alcohol and an acetate group content equivalent to about 2.4 percent by weight of polyvinyl acetate. Of the total aldehydes (2.4 mol.) in the reaction mixture, 60 mol. percent (1.4 mol.) was acetaldehyde.

EXAMPLE 5.—*Polyvinyl acetaldehyde (60)-isobutyraldehyde (40) acetal resin*

88 g. (2 mol.) of polyvinyl alcohol, 58 g. (0.8 mol.) of isobutyraldehyde and 53 g. (1.2 mol.) of paraldehyde were mixed with 500 cc. of 70% (by weight) of aqueous acetic acid. To the resulting mixture were added 1 g. of hydroxylamine hydrochloride (to stabilize the resin) and 10 cc. of hydrochloric acid (sp. g. 1.18). After thorough mixing, at a temperature of about 20° C., a uniform solution was obtained. The solution was allowed to stand at about 20° C. for a few hours, when the resin precipitated as a soft mass. After the mixture had been allowed to stand for two days at about 20° C., it was diluted with about four times its volume of acetone. The resulting solution was poured into cold water when the resin precipitated. The precipitated resin was thoroughly washed with water and finally dried at about 50° C. The resin contained a hydroxyl group content equivalent to about 7.7 percent by weight of polyvinyl alcohol and an acetate group content equivalent to about 3.4 percent by weight of polyvinyl acetate. Of the total aldehydes (2.0 mol.) in the reaction mixture, 60 mol. percent (1.2 mol.) was acetaldehyde.

EXAMPLE 6.—*Polyvinyl acetaldehyde (70)-isovaleraldehyde (30) acetal resin*

172 g. (2 mol.) of polyvinyl acetate (25 centipoises) were dissolved in about 500 cc. of 95% ethyl alcohol. To this solution were added 52 g. (0.6 mol.) of isovaleraldehyde and 62 g. (1.4 mol.) of paraldehyde and 43 cc. of hydrochloric acid (sp. g. 1.18). The resulting solution was allowed to stand, at about 40° C., for about four days. The reaction mixture was then diluted with about twice its volume of 95% ethyl alcohol. The diluted reaction mixture was poured into cold water to precipitate the resin. The resin was thoroughly washed with water and dried at about 50° C. The resin contained a hydroxyl group content equivalent to about 8.7 percent by weight of polyvinyl alcohol and an acetate group content equivalent to about 4.0 percent by weight of polyvinyl acetate. Of the total aldehydes (2.0 mol.) in the reaction mixture, 70 mol. percent (1.4 mol.) was acetaldehyde.

EXAMPLE 7.—*Polyvinyl acetaldehyde (70)-2-ethylbutyraldehyde (30) acetal resin*

172 g. (2 mol.) of polyvinyl acetate (25 centipoises) were dissolved in 500 cc. of 95% ethyl alcohol. To this solution were added 62 g. (1.4 mol.) of paraldehyde, 60 g. (0.6 mol.) of 2-ethylbutyraldehyde and 50 cc. of hydrochloric acid (sp. g. 1.18). The resulting solution was allowed to stand, at about 40° C., for about four days. At the end of this time, the reaction mixture was diluted with about twice its volume of 95% ethyl alcohol. The diluted reaction mixture was poured into cold water to precipitate the resin. The precipitated resin was thoroughly washed with water and dried at about 50° C. The resin contained a hydroxyl group content equivalent to about 7.8 percent by weight of polyvinyl alcohol and an acetate group content equivalent to about 2.2 percent by weight of polyvinyl acetate. Of the total aldehydes (2 mol.) in the reaction mixture, 70 mol. percent (1.4 mol.) was acetaldehyde.

EXAMPLE 8.—*Polyvinyl acetaldehyde (80)-2-ethylbutyraldehyde (20) acetal resin*

172 g. (2 mol.) of polyvinyl acetate (25 centipoises) were dissolved in about 500 cc. of 95% ethyl alcohol. To this solution were added 70 g. (1.6 mol.) of paraldehyde and 40 g. (0.4 mol.) of 2-ethylbutyraldehyde and 50 cc. of hydrochloric acid (sp. g. 1.18). The solution was treated as in the resin precipitated, washed and dried as in Example 7. The resin contained a hydroxyl group content equivalent to about 8.1 percent by weight of polyvinyl alcohol and an acetate group content equivalent to about 2.2 percent by weight of polyvinyl acetate. Of the total aldehydes (2.0 mol.) in the reaction mixture, 80 mol. percent (1.6 mol.) was acetaldehyde.

EXAMPLE 9.—*Polyvinyl acetaldehyde (80)-2-ethylhexaldehyde (20) acetal resin*

210 g. (2.4 mol.) of polyvinyl acetate (25 centipoises) were dissolved in about 500 g. of methyl alcohol. To this solution were added, with stirring, 90 g. (0.7 mol.) of 2-ethylhexaldehyde, 118 g. (2.7 mol.) of paraldehyde and 50 cc. of hydrochloric acid (sp. g. 1.18). The resulting solution was allowed to stand, at about 40° C., for about four days. At the end of this time, the reaction mixture was diluted with about twice its volume of 95% ethyl alcohol. The diluted reaction mixture was poured into cold water to precipitate the resin. The precipitated resin was thoroughly washed with cold water and finally dried at about 50° C. The resin had a hydroxyl group content equivalent to about 10.4 percent by weight of polyvinyl alcohol and an acetate group content equivalent to about 2.2 percent by weight of polyvinyl acetate. Of the total aldehydes (3.4 mol.) in the reaction mixture, 80 mol. percent (0.7 mol.) was acetaldehyde.

Heat accelerates the formation of my new resins, but temperatures over 70° C. are advantageously avoided. A temperature range of from about 20° to 50° C. is preferable.

As acid deesterification catalysts, mineral acids are advantageously employed. Hydrochloric acid is most advantageously employed, since the resins obtained when it is employed are ordinarily more stable than those obtained when sulfuric acid is employed, for example. Trichloracetic acid or organic sulfonic acids can be used.

As acetal condensation catalysts, acids, particularly mineral acids, are likewise advantageously employed. When preparing my new resins by concomitantly deesterifying a polyvinyl ester and condensing the deesterification product with aldehydes, the acid catalyst accelerates both deesterification and condensation. Hydrochloric acid and sulfuric acid are especially useful. As catalysts which promote acetal condensations, but which are less useful as deesterification catalysts, zinc chloride and phosphoric acids may be mentioned.

The resins are advantageously prepared in a solution from which they can be precipitated by diluting the solution with water (e. g. by pouring the solution into water), as illustrated in the above examples. The solvents are employed in conjunction with water and are advantageously water-miscible solvents such as methyl, ethyl or isopropyl alcohols, acetic or propionic acids or 1,4-dioxane for example.

The aldehydes can be employed in their monomeric or polymeric forms or in the form of a derivative which yields the aldehyde in the reaction mixture, such as the diethyl acetal of acetaldehyde for example.

Any polyvinyl ester can be employed in preparing my new resins; for example polyvinyl acetate, polyvinyl chloracetate or polyvinyl propionate. Polyvinyl acetate is especially satisfactory. The viscosity of the polyvinyl ester employed may vary widely. In the above examples, the viscosities of the polyvinyl esters are stated as viscosities, in centipoises, of their molar solutions (86.05 grams per liter in the case of polyvinyl acetate) in benzene at about 20° C.

To prepare film or sheet from my new resins, I first dissolve about 1 part of the resin in from 2½ to 4½ parts of a suitable solvent, such as acetone or a mixture of 90% (by volume) of acetone and 10% methyl alcohol or ethylene dichloride for example. If necessary to obtain a clear solution larger quantities of solvent may be employed. Such a solution is then cast onto a film-forming surface, such as a metal or glass plate or a revolving drum, to desired thickness and the resulting film or sheet is allowed to dry. Drying may be facilitated by blowing warm air over the drying film or sheet. When sufficiently dry, the film or sheet is stripped from the film-forming surface and "cured" by treating with warm air. The "curing" removes the residual solvent, giving a transparent film or sheet of low water susceptibility and fairly low thermoplasticity. The resulting film or sheet can be coated directly with photographic emulsions or can be coated first with resinous or other known "subbing materials" before the photographic emulsion is applied.

The following table shows the moisture susceptibility of film or sheet made from representative of my new resins as compared with film or sheet made from representative of the prior art resins.

| Resin | Mole percent aldehydes | Hydroxyl | Acetate | Moisture susceptibility (swell and shrink amplitude) |
|---|---|---|---|---|
| Ex. 4 | Isobutyraldehyde, —20<br>Acetaldehyde, —80 | 11.4 | 4.7 | 0.24 |
| Ex. 3 | Isobutyraldehyde, —30<br>Acetaldehyde, —70 | 11.4 | 2.2 | 0.14 |
| Ex. 5 | Isobutyraldehyde, —40<br>Acetaldehyde, —60 | 12.0 | 2.4 | 0.00 |
| Ex. 7 | Isovaleraldehyde, —30<br>Acetaldehyde, —70 | 8.7 | 4.0 | 0.08 |
| Ex. 8 | 2-ethylbutyraldehyde, —20<br>Acetaldehyde, —80 | 8.1 | 2.4 | 0.06 |
| Ex. 9 | 2-ethylbutyraldehyde, —30<br>Acetaldehyde, —70 | 7.8 | 2.2 | 0.06 |
| Ex. 10 | 2-ethylhexaldehyde, —20<br>Acetaldehyde, —80 | 10.4 | 2.2 | 0.08 |
| a | Polyvinyl acetaldehyde acetal. | 9.4 | 2.2 | 0.68 |
| b | Polyvinyl butraldehyde acetal. | 13.4 | 2.0 | 0.22 |
| c | Polyvinyl butyraldehyde (20) —acetaldehyde (80) acetal. | 6.8 | 7.3 | 0.27 |
| d | Polyvinyl butyraldehyde (80) —acetaldehyde (20) acetal. | 9.9 | 2.1 | 0.22 |

From the foregoing comparative data it is apparent that film or sheet made from my new resins has very low moisture susceptibility as compared to the acetaldehyde and butyraldehyde-acetaldehyde prior art resins. Thus, the swell and shrink amplitude of film or sheet made from my new resins is less than 0.15 in all cases, except in the case where only 20 mole per cent of isobutyraldehyde was employed in conjunction with 80 mole per cent of acetaldehyde (Ex. 4) to prepare the resin. Here the swell and shrink amplitude is about the same as that of film or sheet made from an ordinary polyvinyl butyraldehyde acetal resin (see b. above). But, film or sheet made from ordinary polyvinyl butyraldehyde acetal resins is too thermoplastic to be employed in the manufacture of cinematographic film. The moisture susceptibility (0.24) of film or sheet made from those of my new resins set forth in Ex. 4 is somewhat lower than that (0.27) of film or sheet made from a polyvinyl acetal in which 20 mole per cent of the acetal groups are butyraldehyde acetal groups and 80 mole per cent of acetaldehyde acetal groups. However, the greater effect of the branched-chain aldehyde is demonstrated by the fact that film or sheet, made from a resin wherein 40 mole per cent of branched-chain aldehyde was used (Ex. 5), has a practically zero swell and shrink, whereas increasing butyraldehyde acetal content of a polyvinyl butyraldehyde acetaldehyde acetal resin from 20 to as high as 80 mole per cent does not greatly lower the swell and shrink amplitude of the film or sheet made from the resin (see c. and d. above).

Film or sheet made from those of my new resins having swell and shrink amplitudes of less than 0.10 is especially useful for the manufacture of photographic film for aerial photography.

The swell and shrink amplitudes given above were determined in the following manner. Sample strips 15 inches long and 1½ inches wide were cut from the film or sheet. Usually two sample strips are cut lengthwise of the film or sheet and two sample strips are cut widthwise of the film or sheet. These strips are then perforated on a punch and die perforating machine with two holes approximately 10 inches apart. Usually two sets of perforations in each strip are made. Changes in dimensions of the strip owing to the action of moisture on the strip are then measured, measurements being taken from the outside edge of one hole to the outside edge of the other hole, approximately 10 inches removed from the first hole.

The strips are first conditioned at 50% relative humidity and then measured. The strips are then tacked loosely on a wooden rack and placed in a constant temperature thermostatically controlled water bath at 100° F. and left for 17 hours. The samples are then wiped to remove excess moisture and reconditioned at 50% relative humidity and then measured again and the dimensional change computed. (Any dimensional change recorded here is not swell and shrink amplitude, but rather is what can be termed irreversible shrinkage. Any change occurring here is due to loss of solvent from the film or sheet and also due to release of mechanical strain). The strips are now placed in a water bath at 125° F. for 30 minutes, spacing them in and out a minute or so apart to allow for measuring. Care should be taken to measure as speedily as possible after the removal from the water after giving them a quick wipe with a towel to remove surplus water as shrinkage takes place almost instantly. The sample is then placed in an oven at 125° F. for one hour, then taken out and measured. This cycle is repeated three times or until the difference between the wet and dry readings becomes constant. The difference between the last wet and dry readings in percentage is the per cent swell and shrink amplitude. This test measures the permanent characteristic tendency of the film or sheet to swell and shrink under the influence of absorbed and desorbed moisture, the difference between the lengthwise and widthwise measurements representing the amount of non-uniformity in the structure lengthwise and widthwise.

My new resins can be pressed into blocks and skived to thin sheets or layers which can be used as a laminating material, e. g. between sheets of glass, particularly if suitably plasticized. My new resins are compatible with a number of plasticizers, such as tributylphosphate, triphenylphosphate, tricresylphosphate, diamylphthalate, dibutylphthalate, di- and triglycerol esters, such as acetates, propionates, butyrates and the like, monochlornaphthalene or the like.

My new resins can be successfully molded or extruded when suitably plasticized.

What I claim as my invention and desire to be secured by Letters Patent of the United States is:

1. A process for preparing a polyvinyl acetal resin containing a hydroxyl group content equivalent to not more than about 15 per cent by weight of polyvinyl alcohol and an acetate group content equivalent to not more than about 5% by weight of polyvinyl acetate comprising reacting, in the presence of a hydrochloric acid acetal condensation catalyst, a polyvinyl compound selected from the group consisting of polyvinyl alcohols and partially deacetylated polyvinyl acetates with a plurality of aldehydes, about 60 mole per cent of said aldehydes being acetaldehyde and about 40 mole per cent of said aldehydes being isobutyraldehyde.

2. A polyvinyl acetal resin containing a hydroxyl group content equivalent to not more than about 15% by weight of polyvinyl acetate and an acetate group content equivalent to not more than about 5% by weight of polyvinyl acetate, about 60 mole per cent of the acetal groups in the resin being acetaldehyde acetal groups and the remainder of the acetal groups being isobutyraldehyde acetal groups.

DONALD R. SWAN.